United States Patent [19]

Liepold

[11] 4,114,833
[45] Sep. 19, 1978

[54] MAGNETIC TAPE CASSETTE

[75] Inventor: August Liepold, Germany

[73] Assignee: AGFA-Gevaert AG, Leverkusen, Germany

[21] Appl. No.: 788,772

[22] Filed: Apr. 19, 1977

[30] Foreign Application Priority Data

Apr. 24, 1976 [DE] Fed. Rep. of Germany ....... 2618069

[51] Int. Cl.² .......................... G03B 1/04; G11B 15/32
[52] U.S. Cl. ................................................... 242/199
[58] Field of Search ........................ 242/194, 197–200, 242/55, 19 A; 352/72–78 R; 360/96, 132

[56] References Cited

U.S. PATENT DOCUMENTS 3,923,271  12/1975  Pertzsch et al. .................... 242/199
3,991,956  11/1976  Machida ............................. 242/199

Primary Examiner—Leonard D. Christian
Attorney, Agent, or Firm—Connolly and Hutz

[57] ABSTRACT

In order to avoid blocking of the tape travel in a compact cassette deriving from loop formation, an oblique rib is provided between tape cavity and idler roller. The rib ends in close vicinity of the side walls of the cassette leaving only a narrow passage between its free end and the side wall for the tape travel.

6 Claims, 5 Drawing Figures

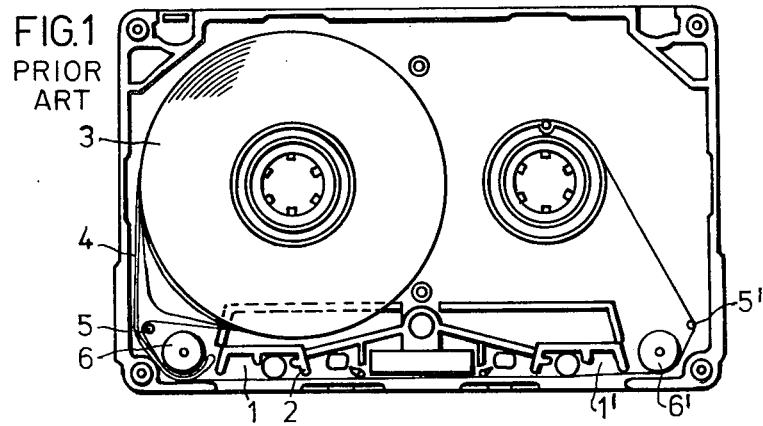
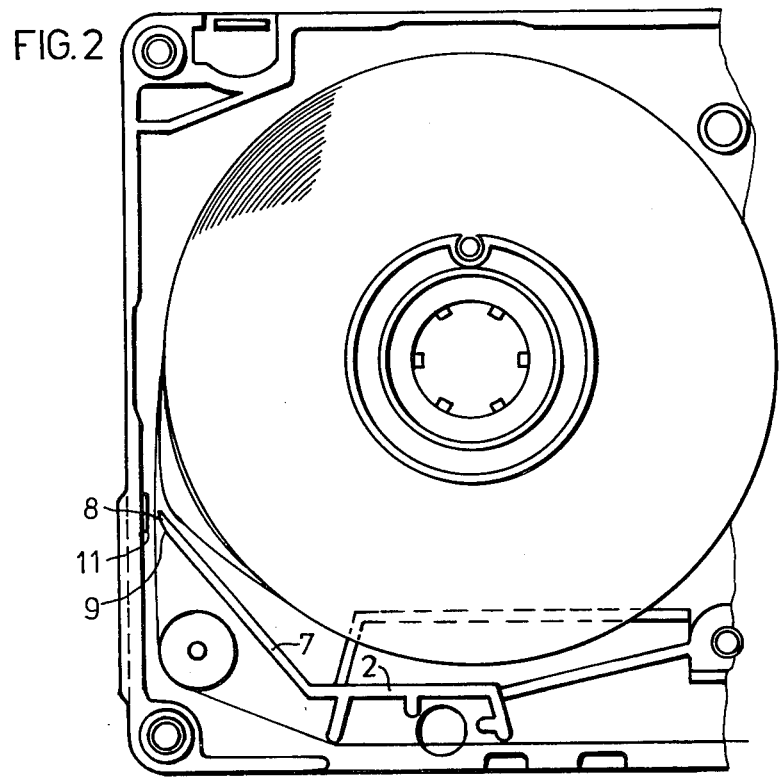

MAGNETIC TAPE CASSETTE

This invention relates to magnetic tape cassettes for recording and reproduction instruments having two winding cores without flanges for carrying the reel of tape and tape idler rollers.

When cassettes are being manufactured in labelling and packaging machines and when they are in transport, it is impossible to avoid vibrations which are liable to loosen the reels if the cores are not held by clamps. Furthermore, when the tape recorder is being switched off or the reel wound back, loops are liable to form in the outer layers of the reel if the core continues to turn through several revolutions. When the apparatus is switched on again, any loops formed in this way are pulled over the idler rollers such as pins or rolls together with the travelling tape and cause blockage the running of the tape. Instructions for use enclosed with compact cassettes therefore generally point out that any loose layers of tape should be tightened by turning the cores before insertion in the recorder.

Spools having a self-stopping mechanism to prevent the formation of loose layers of tape on the reel are described in German Gebrauchsmuster No. 7,521,898, but such cores considerably increase the manufacturing costs of compact cassettes. Rotatable guide levers connected together by an elastic, flexible guide element for the same purpose have been described in German Offenlegungsschrift No. 2,151,628. Cassettes of this kind also can only be produced at great manufacturing cost.

It is an object of the present invention to obviate the above-mentioned disadvantages and to prevent blockage of the running of the tape in the cassette due to loose layers of tape and loops.

This object is achieved by providing a separating rib formed on to the bottom of the cassette housing and extending obliquely in the space between the reel of tape and the idler roller. The height of this rib is equal to the internal height of the cassette and its length between the head chamber and the side wall is such that a narrow gap is left between the free end of the web and the side wall of the cassette. The free end of the rib tapers to a thin edge.

If several layers of tape are stuck together as a result of electro-static forces and adhesion, the outer layer is separated off as it moves the edge of the separating rib so that the remaining layers can slip tightly back on to the reel of their own accord. The separating ribs are molded on to the bottom of the cassette housing on both sides of the head chamber during manufacture of the cassette. The advantage provided by the invention does not increase the manufacturing costs.

In a practical embodiment of the cassette according to the invention, the separating rib may extend in a straight line or in the form of a circular arc having its centre on the axis of the core. According to one particularly advantageous arrangement, the separating partition of the head chamber, which extends parallel to the front of the cassette, is further extended at an angle to form the separating rib. The angle between the rib and the partition is preferably between about 120° and 140°. The width of the gap between the end of the rib and the side wall is preferably of the order of 1 mm. If the tape is fed by hand during manufacture of the cassette, the gap is preferably wider. In that case, the internal side walls of the lower part of the cassette, situated opposite the free end of the rib, are sloped at an acute angle to the plane of the tape. The corresponding region of the internal side walls of the upper part or lid of the cassette is formed in mirror image thereto. Since the space between the sloping side walls and the web is thereby widened out in the form of a cone, the tape can easily be placed into the bottom of the cassette. Moreover, there is no risk of damage to the tape when the lid is placed on the cassette. When the tape recorder is in use, the tape only touches the edge of the web so that its torque is no more affected by the web than it would be by the steadying pin normally provided at this point.

The invention will now be explained with reference to FIGS. 1 to 5.

FIG. 1 is a plan view of a commercially available cassette with loose layers of tape;

FIG. 2 is a plan view of the bottom of a cassette half according to the invention with a straight separating rib;

Figure 3:
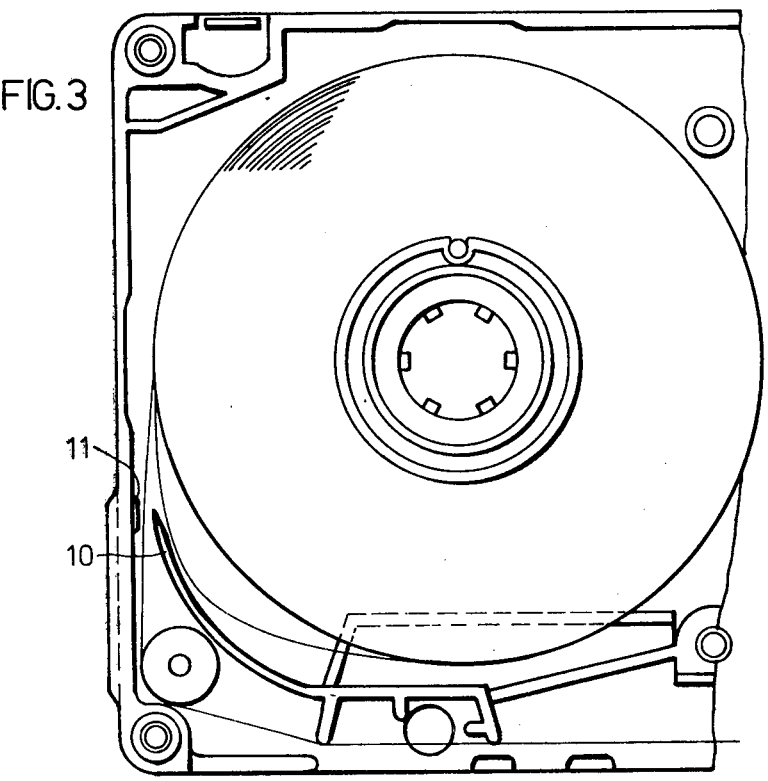
FIG. 3 is a corresponding plan view showing a separating web curved in the form of a circular arc.

At the front of a conventional cassette, there are various openings 1,1' for the magnetic head and erasing head and pressure rollers which are separated from the rest of the space in the cassette by a separating partition 2 to form the so-called head chamber. The magnetic tape 4 runs from the core 3 along to the other side of the cassette by way of the steadying pins 5,5' and rotatably mounted deflecting rollers 6,6'. Layers of tape which have become loose owing to vibration are liable to block the running of the tape, for example due to wrapping round the steadying pin (FIG. 1).

Figure 4:
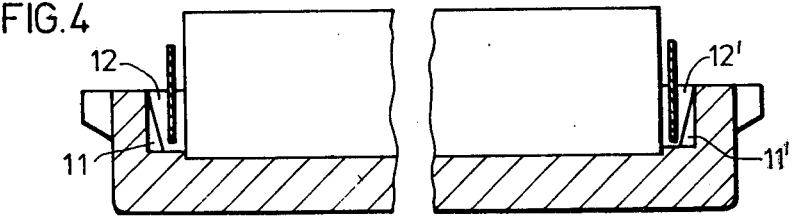
FIG. 4 is a section through the lower part of the cassette according to the invention in the region of the separating rib and sloping internal side walls.
Figure 5:
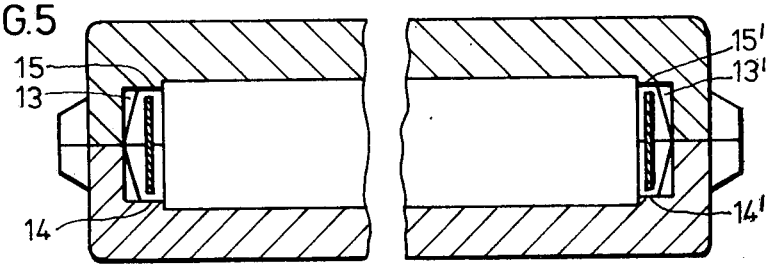
FIG. 5 is a section similar to that of FIG. 4 showing the cassette when closed.

The separating ribs 7 according to the invention are situated in the lower part of the cassette in the space between the reel and the deflecting roller. As can be seen from FIG. 2, they form an angled off prolongation of the separating partition 2 of the head chamber. The length of the separating ribs is such that a gap 8 of about 1 mm is left between the free end of each rib and side wall of the cassette. The height of each separating rib is equal to the internal height of the cassette. The free end of the rib is tapered in the form of a wedge 9. If two or more layers of tape stuck together reach the edge of the rib, the outermost layer is separated from the other layers. In FIG. 3 the ribs are curved in the form of a circular arc 10 centered on the axis of the core. Both embodiments illustrated here leave sufficient space between the reel of tape and the separating web for accomodation of additional tape guide elements such as, for example, the pivotal lever described in German Patent Specification No. 2,115,124. To facilitate manual insertion of the tape, the internal side walls 11,11' of the lower part of the cassette are arranged to slope towards the lower edge of the rib in the region of the gap for the tape, as shown in FIG. 4. Due to the resulting widening out of the gap in the form of a cone 12,12', the tape can easily be inserted. The corresponding region of the internal side walls 13,13' of the upper part of the cassette is sloped off to form the mirror image of the lower part (FIG. 5), so that the tape runs through a narrow gap both at its lower edge 14,14' and its upper edge 15,15'.

What I claim is:

1. A magnetic tape cassette for recording and reproduction instruments, having two winding cores placed side by side, a magnetic tape adapted to be wound on and off the cores idler rollers to guide the tape between the cores, and an obliquely extending rib between the core and an adjacent idler roller, the height of which rib is equal to the internal height of the cassette and the rib ends in close vicinity of the internal side wall of the cassette to leave a narrow gap for the passage of the magnetic tape travel, and the rib being tapered at the said free end in the form of a wedge.

2. A magnetic tape cassette according to claim 1, wherein a head chamber is disposed in the cassette, a separating partition being disposed in the cassette between the head chamber and the cores, and the rib is straight-lined and forms an angled off extension of the separating partition of the head chamber.

3. A magnetic tape cassette according to claim 1, wherein the cores having axes, and the rib is curved in the form of a circular arc centered on the axis of one of the cores.

4. A magnetic tape cassette according to claim 2, wherein the head chamber has two sides, and a rib is arranged on each of the two sides of the head chamber.

5. A magnetic tape cassette according to claim 1 wherein the internal surfaces of the side walls of the lower part (bottom) of the cassette are inclined at an acute angle in the region whereby they face the tapered ends of the ribs and the interanl surfaces of the upper part (cover) of the cassette being formed in mirror image thereto.

6. A magnetic tape cassette according to claim 1 wherein the rib is integral with the lower part of the cassette housing.